(12) United States Patent
Bandak

(10) Patent No.: US 8,848,884 B2
(45) Date of Patent: Sep. 30, 2014

(54) COMPUTERIZED METHOD AND SYSTEM FOR RANDOMIZED COMPILATION OF ELECTRONIC IDENTIFIERS

(75) Inventor: Christopher George Bandak, Richmond Hill (CA)

(73) Assignee: Forum Research Inc., Toronto, Ontario (CA)

( * ) Notice: Subject to any disclaimer, the term of this patent is extended or adjusted under 35 U.S.C. 154(b) by 25 days.

(21) Appl. No.: 13/394,118

(22) PCT Filed: Sep. 4, 2009

(86) PCT No.: PCT/CA2009/001228
§ 371 (c)(1),
(2), (4) Date: Mar. 2, 2012

(87) PCT Pub. No.: WO2011/026211
PCT Pub. Date: Mar. 10, 2011

(65) Prior Publication Data
US 2012/0163570 A1    Jun. 28, 2012

(51) Int. Cl.
*H04M 11/00* (2006.01)
*H04M 3/51* (2006.01)
*H04L 29/06* (2006.01)
*G06Q 30/02* (2012.01)

(52) U.S. Cl.
CPC .......... *H04M 3/5158* (2013.01); *H04L 65/104* (2013.01); *G06Q 30/02* (2013.01)
USPC ................................ 379/90.01; 379/216.01

(58) Field of Classification Search
CPC .................. H04M 3/5158; H04M 2203/6045; H04L 65/104; G06Q 30/02
USPC ................ 379/216.01, 221.08, 205, 261, 204
See application file for complete search history.

(56) References Cited

U.S. PATENT DOCUMENTS

| | | | |
|---|---|---|---|
| 6,141,341 A * | 10/2000 | Jones et al. | 370/352 |
| 6,442,547 B1 | 8/2002 | Bowman-Amuah | |
| 6,865,266 B1 * | 3/2005 | Pershan | 379/221.13 |
| 7,734,031 B1 * | 6/2010 | Goodman et al. | 379/221.08 |
| 2005/0004838 A1 | 1/2005 | Perkowski et al. | |
| 2005/0010475 A1 | 1/2005 | Perkowski et al. | |
| 2007/0206758 A1 * | 9/2007 | Barak | 379/202.01 |
| 2010/0172484 A1 * | 7/2010 | Leung et al. | 379/216.01 |

OTHER PUBLICATIONS

ISR mailed on May 21, 2010 for PCT/CA2009/001228.
IPRP/WO issued on Mar. 6, 2012 for related PCT/CA2009/001228.
Advertisement from "VUE magazine", Probit—The Evolution of Panel Research—Marketing Research and Intelligence Association Publication, Oct. 2008.
Advertisement from "VUE magazine", Probit—The Evolution of Panel Research—Marketing Research and Intelligence Association Publication, Sep. 2009.

* cited by examiner

*Primary Examiner* — Amal Zenati
(74) *Attorney, Agent, or Firm* — Ladas & Parry, LLP

(57) ABSTRACT

A computerized method and system for compiling electronic identifiers is provided. In one embodiment a computer-based engine is provided that includes a processor and two communication gateways. The first communication gateway connects to a plurality of first-type communication devices. The second communication gateway connects to a plurality of second-type communication devices. The processor is configured to randomly connect to at least one of the first-type communication devices and receive input representing an address of at least one of the second-type communication devices.

21 Claims, 2 Drawing Sheets

COMPUTERIZED METHOD AND SYSTEM FOR RANDOMIZED COMPILATION OF ELECTRONIC IDENTIFIERS

CROSS-REFERENCE TO RELATED APPLICATIONS

This application is the U.S. National Stage of International Patent Application No. PCT/CA2009/001228 filed on Sep. 4, 2009, the disclosure of which is hereby incorporated by reference in its entirety.

FIELD

The present invention relates generally to computer data processing systems and more specifically relates to a computerized method and system for compiling electronic identifiers.

BACKGROUND

When properly executed, surveys can be an immensely valuable tool in a wide variety of endeavours, including social sciences, marketing, customer relationships, and political polling. Other endeavours that benefit from surveys can also be enumerated.

A completely accurate survey would of course involve every member of a relevant target group. However, such breadth is often impractical and surveying techniques have been developed whereby only a sample of the relevant target group need take the survey. If the sample is of a sufficient size, and sufficiently random, then the results of the survey can have a high degree of accuracy in reflecting the results of the survey were the entire target group to take the survey. Computerized methods and systems can further assist in the accuracy and speed of taking such surveys.

SUMMARY

An aspect of the specification provides a computing engine comprising: at least one processing unit; at least one storage unit connected to the at least one processing unit; at least one public switched telephone network (PSTN) gateway connected to the at least one processing unit; the PSTN gateway configured connect to a plurality of plain old telephone system (POTS) terminals via the PSTN; at least one Internet gateway connected to the at least one processing unit; the Internet gateway configured connect to a plurality of computing clients via the Internet; the processing unit configured to perform a random connection to at least one of the POTS terminals and to receive an electronic address associated with at least one of the computing clients.

The electronic address can be an email address.

The processing unit can be configured to receive a set of telephone numbers corresponding to at least a portion of the POTS terminals, and the processing unit can be configured to randomly select a POTS terminal from the set in order to perform the random connection.

The processing unit can be configured to perform a plurality of random connections to different POTS terminals and to receive a plurality of electronic addresses corresponding to each of the POTS terminals.

A number of the plurality of random connections can correspond to a sample size determined according to a survey design.

The processing unit can be further configured to validate the electronic address. The validation can be implicit. The validation can also explicit whereby the processing unit addresses a query to the electronic address; the query including a request for a response having a predefined expected contents. The predefined expected contents can correspond to a password that was provided as part of completing the random connection.

The processing unit can be configured to generate a voice message at the at least one of the POTS terminals, the voice message requesting provision of the electronic address.

Another aspect of the specification provides a computing engine comprising at least one processing unit; at least one storage unit connected to the at least one processing unit at least one first-type communication gateway connected to the at least one processing unit; the first-type communication gateway configured connect to a plurality of first-type communication terminals via a first network; at least one second-type communication gateway connected to the at least one processing unit; the second-type communication gateway configured connect to a plurality of second-type communication terminals via a second network; the processing unit configured to randomly connect to at least one of the first-type communication terminals and to receive an address corresponding to at least one of the second-type communication terminals.

Another aspect of the specification provides a computerized method for randomized compilation of electronic addresses comprising: via at least one processing unit, performing a random selection of one of a plurality of plain old telephone system (POTS) terminal addresses associated with a public switched telephone network (PSTN); via the at least one processing unit, controlling a PSTN gateway interconnecting the processing unit and the PSTN to establish a connection with the one of the POTS terminal addresses; via the at least one processing unit, sending an electronic message representing a request to provide an electronic address associated with at least one of a plurality of computing clients that are connected to a data network; via the at least one processing unit, receiving the electronic address associated with the at least one of a plurality of computing clients that are connected to the data network; via the at least one processing unit, storing the electronic address associated with the at least one of a plurality of computing clients in a storage device.

DETAILED DESCRIPTION OF THE EMBODIMENTS

Figure 1:
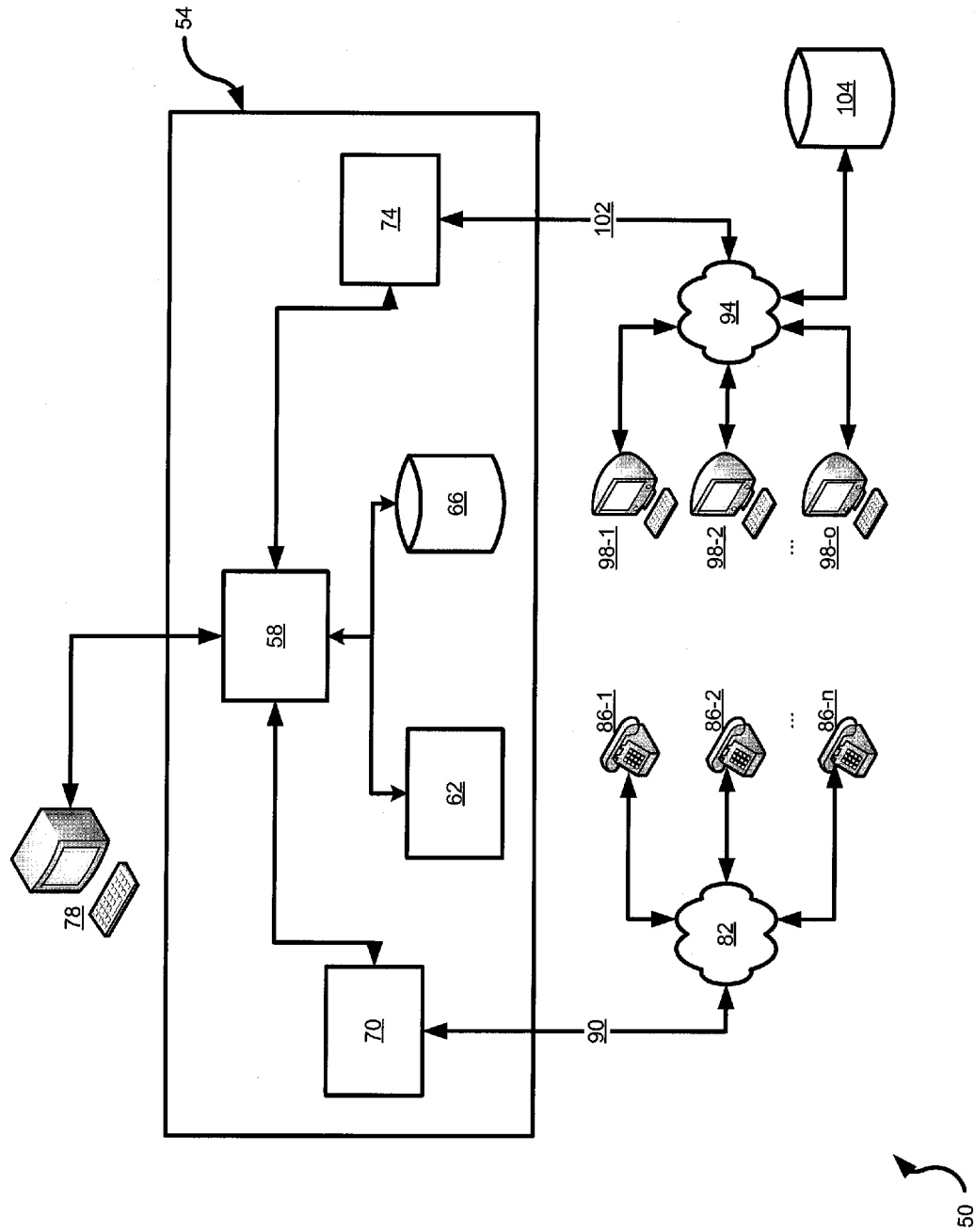
FIG. 1 is a schematic representation of a system for randomized compilation of electronic identifiers.

Referring now to FIG. 1, a system for randomized compilation of electronic identifiers is indicated generally at 50. System 50 comprises a computing engine 54, which itself comprises a processing unit 58 that interconnects volatile storage 62 and non-volatile storage 66. Engine 54 also comprises a first communication gateway 70 connected to processing unit 58, and a second communication gateway 74 also connected to processing unit 58. System 50 also comprises an administration terminal 78 that connects to processing unit 58. Administration terminal 78 is configured to provide input to processing unit 58 via a keyboard or mouse or other input device, and also configured to generate output from processing unit 58 via a display or other output device.

Engine 54 can be implemented as a single server, or an array of servers, based on any well-known computing environment(s) including a module that houses one or more central processing units, volatile memory (e.g. random access memory), persistent memory (e.g. hard disk devices) and network interfaces. For example, engine 54 can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments, or array of computing devices, for engine 54 is contemplated. Furthermore, various functions within each engine 54 can be divided out amongst different servers.

System 50 also comprises a first communication network 82 that connects to a plurality of first-type communication terminals 86-1, 86-2 . . . 86-n. (Generically, first-type communication terminal 86, and collectively, first-type communication terminals 86). A backhaul link 90 connects network 82 to first communication gateway 70**.

System 50 also comprises a second communication network 94 that connects to a plurality of second-type communication terminals 98-1, 98-2 . . . 98-n. (Generically, second-type communication terminal 98, and collectively, second-type communication terminals 98). A backhaul link 102 connects network 94 to second communication gateway 74**.

In a present exemplary embodiment, first-type communication terminals 86 are plain old telephone service (POTS) telephones and network 82 is the public switched telephone network (PSTN). Also in the present exemplary embodiment, second-type communication terminals 98 are desktop or laptop computing devices with email and web-browsing functionality and network 94 is the Internet.

Of note is that each first-type communication terminals 86 and POTS network 82 reflect a communication system characterized by an addressing scheme that is finite and predictable. For example, in North America, POTS telephones have standard ten-digit telephone number of the form "XXX-XXX-XXXX". Such a scheme is finite as the ten-digit number will always fall within the range of zero through 9,999,999,999 even if not all of those numbers are actually used. Accordingly there are is a total of "n" possible first-type communication terminals 86, where n has a theoretical maximum of 9,999,999,999.

In contrast, each second-type communication terminal 98 and Internet 94 reflect a communication system that is characterized by an addressing scheme that is infinite and not predictable. For example, each second-type communication terminal 98 may have an email client application associated with an email address of the form AAAA@BBBBB.CCC. Note that none of the fields in the email address need have a consistent number of characters and therefore there are potentially an infinite number of possible email address combinations. Accordingly there are total of "o" possible second-type communication terminals 86, where o has no theoretical maximum at all.

System 50 also comprises an external database 104 that is connectable to processing unit 58 via network 94, link 102 and gateway 74. External database 104 is configured to maintain a list of addresses for each first-type communication terminal 86.

Figure 2:
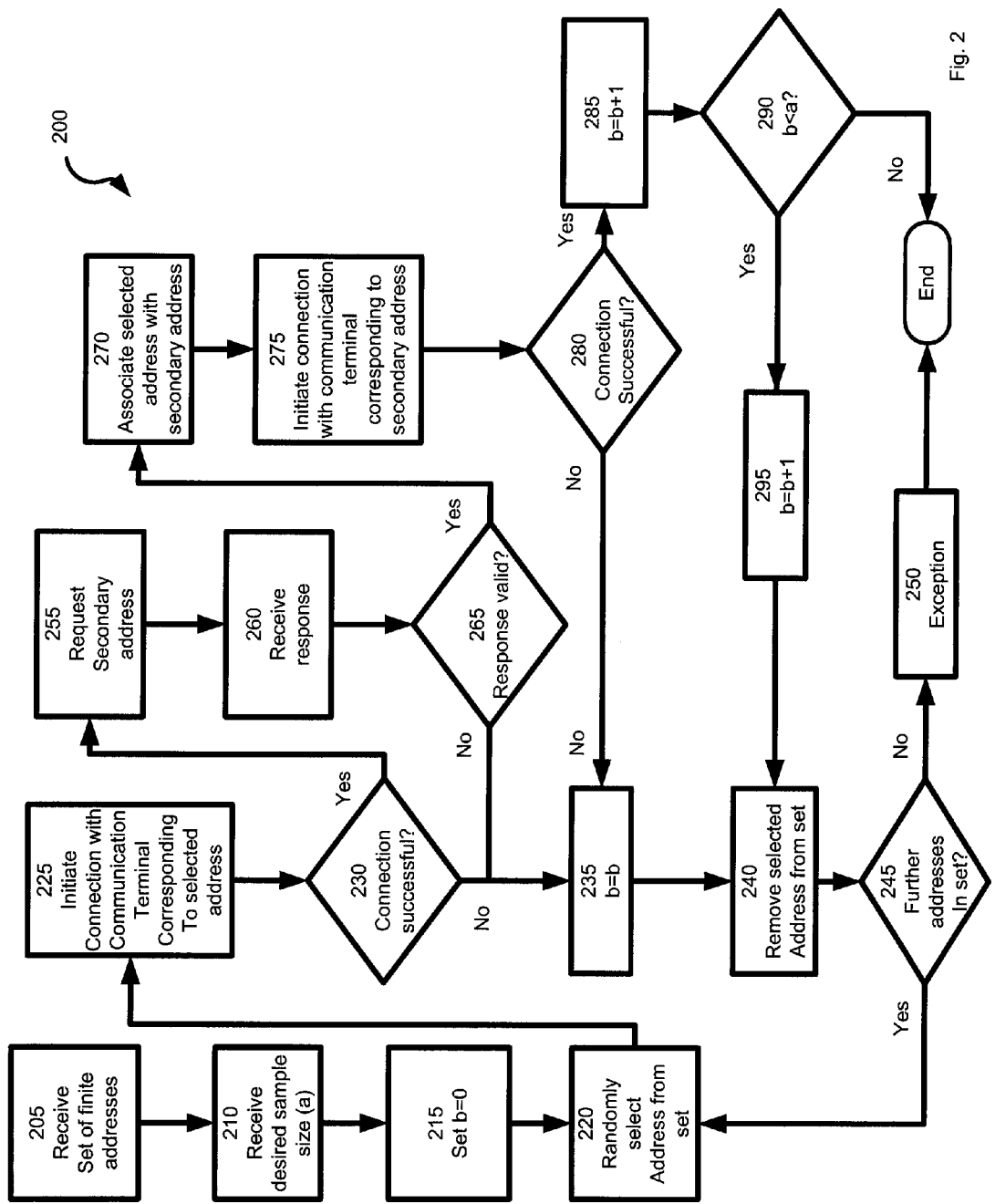
FIG. 2 is a flowchart depicting a method for randomized compilation of electronic identifiers.

Referring now to FIG. 2, a method for randomized compilation of electronic identifiers is represented in the form of a flow-chart and indicated generally at 200. Method 200 can be performed using system 50, and hereafter method 200 will be explained with reference to system 50. It should be understood however that system 50 or method 200 or both can be modified.

At block 205, a first set of addresses is received. In system 50, block 205 is effected by processing unit 58, which receives electronic data representing a finite set of addresses. In the present embodiment the finite set of addresses represent some or all of the addresses for each first-type communication terminal 86. The data can be manually entered via terminal 78, or received from external database 104. When the data is received at processing unit 58, it can also be locally stored in persistent storage 66 for further use.

In a present embodiment, the set of addresses can be selected to correspond with only a portion of first-type communication terminals 86. In the context of delivering surveys, the portion of first-type communication terminals 86 can be selected based on a geographic region where it is known that first-type communication terminals 86 are expected to be located. Again, referring to the North American region, it can be desired to only include those first-type communication terminals 86 that are located in Canada, in which case the set of addresses received at block 205 can be restricted to addresses that correspond to first-type communication terminals 86 located in Canada. By the same token, it can also be desired to restrict the set of addresses received at block 205 to a particular sub-type. For example, many POTS telephone numbers are assigned to non-POTS networks, such as wireless telephony communication devices or Voice over Internet Protocol (VOIP) devices. Accordingly, the set of addresses received at block 205 can be restricted to land-line communication terminals 86 that are based on POTS. It will now be apparent that other criteria can be used to select only particular sets of addresses at block 205.

At block 210, a desired sample size is received, and represented further herein as variable "a". The number "a" can be equivalent to the total number of addresses received at block 205. More typically, the number "a" is smaller, and possibly much smaller, than the total number of addresses received at block 205. Where method 200 is being used in relation to administration of a survey, then the number "a" can be set to correspond to a survey sample size that is established during the design of the survey. Of course, when the number "a" is greater, so too is the confidence in the results of the survey.

At block 215, a counter is set to zero such that subsequent cycles through the remaining steps of method 200 can be tracked in relation to the desired sample size "a".

At block 220, an address is randomly selected from the address set. Various random number generation operations can be used by processing unit 58 to effect block 220. Generally, it is desired to select a high-quality operation that, as much a possible, produces a truly random result. Examples of random number generation operations are discussed further below. Assume, for example, that as a result of block 220 that the address for first-type communication terminal 86-1 is selected.

At block 225 communication is initiated with a first-type communication terminal 86 that corresponds to the address selected at block 220. In this example, first-type communication terminal 86-1. To effect block 225, processing unit 58 controls gateway 70 so as to dial the POTS telephone number associated with first-type communication terminal 86-1 and wait for confirmatory signals from network 82 that this communication has been successfully initiated.

Gateway 70 can be configured with an auto-dialer to perform block 225. Where a 'busy-signal' is received then gateway 70 can be further configured to periodically redial. Likewise, where there is a ring-back signal, but no answer, then gateway 70 can also be configured to attempt to periodically redial a predefined number of times.

At block 230, a determination is made as to whether a successful connection has been made. In this specific example, processing unit 58 and gateway 70 can be configured to ascertain whether a connection with first-type communication terminal 86-1 was successful. For example, a "no" determination will be reached where a busy signal, or "no answer" is consistently received despite attempting to redial for the predefined number of times. A "no" determination can also be reached where network 82 sends a signal indicating that the number is not actually connected.

If a "no" determination is made at block 230, then at block 235 the counter from block 215 is left unchanged, and at block 240 the address selected at block 220 is removed (or flagged for such) from the set of addresses originally received at block 25.

At block 245 a determination is made as to whether or not there are any remaining addresses in the set received at block 205. A "no" determination leads to an exception block 250 (e.g. where an error message is generated on terminal 78) and method 200 ends. A "yes" determination at block 245 returns method 200 to block 220 at which point another address is randomly selected from the remaining set of addresses. In other words, the address removed at block 240 is no longer a possible result during the performance of block 220.

Returning now to block 230, if a "yes" determination is made at block 230 then method 200 advances to block 255. A "yes" determination would typically be reached when a signal is received via network 82 that first-type communication terminal 86-1 has been answered.

At block 255, a request is sent for a secondary address. In system 50, block 255 is typically effected by processing unit 58 generating an audio-message that was previously stored in storage 66 which requests the provision of an address associated with a second-type communication terminal 98. In a present embodiment, the address that is requested is preferred to be an address that operated by the answerer at block 255. Assuming that first-type communication terminal 86-1 and second-type communication terminal 98-1 are operated by one answerer, then the address that is requested would be an address that is associated with second-type communication terminal 98-1.

Optionally, at block 255, further steps can be taken to try and verify that the answerer of terminal 98-1 actually owns or otherwise has control over terminal 98-1. For example, a message can be played inquiring if the answerer owns or otherwise has such control, with responses gathered via interactive voice response (IVR) technology. As a further enhancement at block 255, IVR technology can be employed to select a language that is preferred by the answerer, and then the request for the secondary address can be made via such language.

At block 260, a response is received to the request made at block 255. The form in which the response is received is not particularly limited. The response can be received via terminal 86-1 and can be via voice, or via entry of a sequence of dual-tone-multi-frequency DTMF key presses on terminal 86-1. The response can also be via terminal 98-1, where an email or other electronic signal is sent directly from terminal 98-1 to processing unit 58 indicating the association between terminal 86-1 and terminal 98-1.

Where the received response is via voice, sent through terminal 86-1 to processing unit 58, then processing unit 58 can additionally be configured with a voice-to-text module that converts the voice representation of the received address into an American Standard Code for Information Interchange (ASCII) format or a similar code that can then be used to generate a string of numbers or text or both which can be used to address communication terminal 98-1 directly through network 94. Another option is that an operator of terminal 78 listens to the voice representation, either a recording or in real time, and manually enters the string of numbers or text or both which can be used to address communication terminal 98-1 directly through network 94.

Where the received response is via DTMF, then likewise the DTMF signals are decoded by processor 59 into a string of numbers or text or both which can be used to address communication terminal 98-1 directly through network 94.

Where the received response is via terminal 98-2, then the response will typically inherently be string of numbers or text or both which can be used to address communication terminal 98-1 directly through network 94. Additionally, however, if the response is receive via terminal 98-1 then a verification process can be employed to validate the correspondence between terminal 86-1 and terminal 98-1. For example, a unique web-site address hosted by processing unit 58, combined with a unique password that is provided as part of the request at block 255 can be employed. Thus, terminal 98-1 can be used to access the web-page hosted by processing unit 58, and the web-page can prompt for entry of the POTS number associated with terminal 86-1, as well as the unique password that was provided at block 58, thereby validating the association between terminal 86-1 and terminal 98-1.

The type of address that is received at block 260 is not particularly limited. For example, email addresses would be a common type of address received at block 260 which would reflect an association with an appropriate terminal 98. Other examples include instant message addresses or social networking web-site identities.

At block 265, the address received at block 265 is validated. The validation can be implicit or explicit or both. An implicit validation of an email address can be based on a determination as to whether or not the email address is properly formed, generally corresponding to the format of AAAA@BBBBB.CCC. For example, the absence of an "@" symbol, or the presence of multiple "@" symbols, provides an indication that the address is not properly formed and therefore implicitly the received address will fail validation at block 265.

An explicit validation at block 265 can include sending a communication from processing unit 58 that is addressed to the address that is received at block 260 (i.e. terminal 98-1), and then waiting for a response from that address. Again, using the specific example of email, an email can be sent from processing unit 58 to terminal 98-1 via network 94 that asks the email-recipient to provide data-input representing a confirmation. Such a confirmation could include a confirmation that in fact terminal 98-1 is associated with terminal 86-1. The confirmation could also include a password or other unique data string that was initially provided at block 255 via terminal 86-1, whereby such a password would be received at terminal 98-1 and sent to processing unit 58 to complete the validation.

In a present embodiment, a "no" determination at block 265 causes method 200 to return to block 235, and then to block 240, ultimately leading back to block 220 or to an exception at block 250, as previously described. (In a variation, a "no" determination could also include one or more attempts to retry request for the secondary address by re-cycling one or more times through blocks 255, 260 and 265 rather than immediately returning to block 235 from block 265 on a validation failure at block 265).

A "yes" determination at block 265 causes method 200 to advance to block 270, at which point an association is made between address selected at block 220, and the address received at block 260. In the specific example above, processor 54 can effect block 270 by storing an entry in a database that identifies a relationship between the address selected at block 220 (e.g. terminal 86-1) and the address received at block 260 (e.g. terminal 98-1).

At block 275, a connection is initiated with the address associated with the communication terminal received at block 260. Such a communication can include a further email or other type of electronic communication that is between processor 54 and terminal 98-1. In the survey example, it is contemplated that block 275 can include the initiation of the administration of a survey via terminal 98-1, and utilizing the interactive hardware functionality of terminal 98-1.

At block 280, a determination is made as to whether the communication initiated at block 275 was successful. If the survey being administered is not completed, or not responded to, then a "no" determination would be made at block 280. However, a successful completion of the survey leads to a "yes" determination at block 280.

At block 285, the counter initiated at block 215 is incremented (i.e. b=b+1) and at block 290 a determination is made as to whether the desired sample size has been fulfilled (i.e. is b<a?). If the desired sample size has not been fulfilled, then method 200 advances to block 295 at which point the counter initiated at block 215 is incremented by one (i.e. b=b+1) and then method 200 returns to block 240, which has been previously described.

If a "no" determination is made at block 290 (i.e. the desired sample size is fulfilled), then method 200 ends with the successful completion of the survey.

Variations are contemplated. For example in method 200, the counter can be omitted in favour of modifying method 200 such that the entire set of finite addresses received at block 205 is contacted. This can be effected by setting "a" at block 210 to equal the total number of addresses received at block 205. Alternatively, blocks 210, 215, 235, 285, 290, etc. (i.e. those blocks that relate to counting) can be omitted. Furthermore, various ones of the validations (e.g. block 265) can be omitted if the potential resulting errors are acceptable within the parameters of the survey design.

As another example, the process for randomly selected addresses of first-type communication terminals can be effected in different ways. For example, seeds can be downloaded from an external vendor (e.g. which operates database 104) which contain unique ten-digit phone numbers, as well as any other identifying fields in the seed sample.

The seeds can then be imported into a SQL Server database and stored in storage 66. During the important, each seed is assigned its own numeric Increment value, which is initially set to zero and constrained within the range 0-9,999.

A sample size and all the filters to be applied to the seeds are then manually provided through terminal 78.

Processing unit 58 then retrieves the entire set of seeds from database 66 matching the specified filters and enumerates them sequentially. If no seeds match the conditions, the process is terminated. Otherwise, the processing unit 58 calculates and displays the ratio of sample size to number of seeds.

Processing unit 58 then uses a random number generator operation. Any off-the-shelf random number generator operation can be used, but in one example, where the SQL database at storage 66 is a Microsoft® SQL server, then the random number generator operation provided with that SQL software can be used.

Processing unit 58 uses the random number generator to obtain a random floating-point value between zero and one. Processing unit 58 multiplies the value by the number of seeds and discards all the digits after decimal point. The resulting number is then used by the processing unit 58 to pick a seed with the same sequential number from the previously selected set. This process provides processing unit 58 with a randomly selected seed.

An increment counter associated with the seed is increased by one by processing unit 58. If the increment counter result equals 10,000, then the increment value is reset to 0.

The processing unit 58 then adds the last four digits of the phone number contained in the selected seed and the increment value. If the resulting value contains more than four digits, only the four least significant digits are stored in storage 66 by processing unit 58. If the result contains less than four digits, processing unit 58 appends zeroes to the left of the result in order to produce a four-digit value. This procedure allows for the same seed to be used 10,000 times before producing a duplicate value, which effectively helps achieve the functionality of block 240.

The resulting four-digit value is then appended to the first six digit of the phone number contained in the selected seed. This results in a ten-digit phone number that becomes a candidate for use at block 225.

If the newly generated phone number is already present in the current sample, then it is discarded by processing unit 58. Otherwise, the number appended to the sample along with the area code, first character of the postal code or zip code of a physical address corresponding to the location of first-type terminal 86, and first three characters of the postal code associated with the seed. Each generated number is saved as record in a comma-separated file (or other database format) containing these four columns.

Random number generation is then repeated until the sample reaches the size specified by user.

The foregoing is intended to provide non-limited examples of how the present invention can be implemented. The scope of time-limited monopoly sought is defined solely by the claims attached hereto.

The invention claimed is:

1. A computing engine for conducting a survey, the computing engine comprising:
    at least one processing unit;
    at least one storage unit connected to said at least one processing unit;
    at least one public switched telephone network (PSTN) gateway connected to said at least one processing unit; said PSTN gateway configured to connect to a plurality of plain old telephone system (POTS) terminals via the PSTN; and
    at least one Internet gateway connected to said at least one processing unit;
    said Internet gateway configured to be connected to a computing client via the Internet, wherein said computing client is associated with an electronic address for identification;
    said processing unit configured to perform a random connection to at least one of said POTS terminals and to receive said electronic address associated with said computing client, wherein said random connection is performed using a random number generator to automatically generate a phone number; and
    said processing unit configured to associate said at least one of said POTS terminals with said computing client.

2. The computing engine of claim 1 wherein said electronic address is an email address.

3. The computing engine of claim 1 wherein said processing unit is configured to generate a set of telephone numbers corresponding to at least a portion of said POTS terminals, and said processing unit is configured to randomly select a POTS terminal from said set in order to perform said random connection.

4. The computing engine of claim 3 wherein processing unit is configured to perform a plurality of random connections to different POTS terminals and to receive a plurality of electronic addresses corresponding to each of said POTS terminals.

5. The computing engine of claim 4 wherein a number of said plurality of random connections corresponds to a sample size determined according to a survey design.

6. The computing engine of claim 1 where said processing unit is further configured to validate said electronic address.

7. The computing engine of claim 6 wherein said validation is implicit.

8. The computing engine of claim 6 wherein said validation is explicit whereby said processing unit addresses a query to said electronic address; said query including a request for a response having a predefined expected contents.

9. The computing engine of claim 8 wherein said predefined expected contents corresponds to a password that was provided as part of completing said random connection.

10. The computing engine of claim 1 wherein said processing unit is configured to generate a voice message at said at least one of said POTS terminals, said voice message requesting provision of said electronic address.

11. A computing engine for conducting surveys, the computing engine comprising:
    at least one processing unit;
    at least one storage unit connected to said at least one processing unit;
    at least one first-type communication gateway connected to said at least one processing unit; said first-type communication gateway configured to connect to a plurality of first-type communication terminals via a first network; and
    at least one second-type communication gateway connected to said at least one processing unit; said second-type communication gateway configured to connect to a second-type communication terminal via a second network, wherein said second-type communication terminal is associated with an address for identification;
    said processing unit configured to perform a random connection to at least one of said first-type communication terminals and to receive said address associated with said second-type communication terminal, wherein said random connection is performed using a random number generator to automatically generate a phone number; and
    said processing unit is configured to associate said at least one of said first-type communication terminals with said second-type communication terminal.

12. A computerized method for randomized compilation of electronic addresses for conducting surveys, the method comprising:
    via at least one processing unit, performing a random selection of one of a plurality of plain old telephone system (POTS) terminal addresses associated with a public switched telephone network (PSTN), wherein performing said random selection comprises using a random number generator to automatically generate a phone number;
    via said at least one processing unit, controlling a PSTN gateway interconnecting said processing unit and said PSTN to establish a connection with said one of said POTS terminal addresses;
    via said at least one processing unit, sending an electronic message representing a request to provide an electronic address associated with at least one of a plurality of computing clients that are connected to a data network, wherein said electronic address is for identification of said at least one of a plurality of computing clients;
    via said at least one processing unit, receiving said electronic address associated with said at least one of a plurality of computing clients that are connected to the data network;
    via said at least one processing unit, storing said electronic address associated with said at least one of a plurality of computing clients in a storage device.

13. The method of claim 12 wherein said electronic address is an email address.

14. The method of claim 12 wherein said processing unit is configured to generate a set of telephone numbers corresponding to at least a portion of said POTS terminals, and said processing unit is configured to randomly select a POTS terminal from said set in order to perform said random connection.

15. The method of claim 12 comprising repeating said steps to receive a plurality of electronic addresses corresponding to each of said POTS terminals.

16. The method of claim 15 wherein a number of said plurality of random connections corresponds to a sample size determined according to a survey design.

17. The method of claim 12 where said processing unit is further configured to validate said electronic address.

18. The method of claim 17 wherein said validation is implicit.

19. The method of claim 17 wherein said validation is explicit whereby said processing unit addresses a query to said electronic address; said query including a request for a response having a predefined expected contents.

20. The method of claim 19 wherein said predefined expected contents corresponds to a password that was provided as part of completing said random connection.

21. The method of claim 12 wherein said processing unit is configured to generate a voice message at said at least one of said POTS terminals, said voice message requesting provision of said electronic address.

* * * * *